United States Patent
Rottenberger et al.

[11] Patent Number: 6,102,171
[45] Date of Patent: Aug. 15, 2000

[54] DAMPING VALVE WITH ADJUSTABLE DAMPING FORCE

[75] Inventors: Theo Rottenberger, Gefäll; Rolf Münz, Grafenrheinfeld, both of Germany

[73] Assignee: Mannesmann Sachs AG, Schweinfurt, Germany

[21] Appl. No.: 09/090,020

[22] Filed: Jun. 10, 1998

[30] Foreign Application Priority Data

Jun. 10, 1997 [DE] Germany .......................... 197 24 328

[51] Int. Cl.⁷ ................................. F16F 9/34; F16F 9/48
[52] U.S. Cl. .................. 188/319.2; 188/285; 137/512.1; 137/540; 137/539; 137/614.2
[58] Field of Search .............................. 188/322.14, 318, 188/315, 299.1, 280, 281, 319.2, 285; 137/512.1, 540, 539, 614.2, 530; 251/205

[56] References Cited

U.S. PATENT DOCUMENTS

| | | | |
|---|---|---|---|
| 3,528,531 | 9/1970 | Schweller et al. | 188/88 |
| 4,076,225 | 2/1978 | Houghton | 267/34 |
| 4,515,253 | 5/1985 | Itoh | 18/314 |

FOREIGN PATENT DOCUMENTS

| | | |
|---|---|---|
| 08270713 | 10/1996 | European Pat. Off. . |
| 77 34 675 | 4/1978 | Germany . |
| 28 09 744 | 9/1978 | Germany . |
| 33 13 613 A1 | 10/1983 | Germany . |
| 195 42 293 A1 | 6/1996 | Germany . |
| 1 95 47 910 | 1/1997 | Germany . |
| 08270713A | 10/1996 | Japan . |
| 2 084 289 | 4/1982 | United Kingdom . |

*Primary Examiner*—Robert Oberleitner
*Assistant Examiner*—Bradley King
*Attorney, Agent, or Firm*—Cohen, Pontani, Lieberman & Pavane

[57] ABSTRACT

An adjustable damping valve in a damping valve housing for a vibration damper includes a valve unit with an inlet opening in the region of a valve seat face. A valve disk is supported on the valve seat face. The valve disk is pretensioned on its rear side by a spring, wherein the pretensioning of the spring is adjustable for changing the damping force in that a supporting surface of the spring is displaceable. The supporting surface is in a working connection with a catch device, wherein the catch device can be locked by steps in that the spring which acts on the valve disk applies force to the locking bodies of the catch device in a catch profile for resiliently holding the supporting surface in a locked position.

10 Claims, 3 Drawing Sheets

DAMPING VALVE WITH ADJUSTABLE DAMPING FORCE

BACKGROUND OF THE INVENTION

1. Field of the Invention

The invention is directed to a damping valve for a vibration damper with an adjustable damping force.

2. Description of the Related Art

A prior art adjustable damping valve is disclosed in German reference DE 195 42 293 A1. The prior art adjustable damping valve includes a damping valve housing for a vibration damper comprising a valve unit with an inlet opening in the region of the valve seat face on which is supported a valve disk which is pretensioned on its rear side by a spring. The pretensioning of the spring is adjustable for changing the damping force in that a supporting surface of the spring is displaceable. The vibration damper in which the adjustable damping valve is installed is preferably used for car racing. Consequently, the damping valve must be adjusted to the respective vehicle and then adjusted depending on the racing course. A shifting of the adjusted setting of the damping force of the damping valves that may occur during vehicle vibrations occurring under high loading must be prevented. The simplest possibility for this is to fix the valve, once it has been adjusted, by suitable measures such as thread locking paste. However, it is likely that this very adjustment will be completely unsuitable for use in the next race.

SUMMARY OF THE INVENTION

It is the object of the present invention to further develop an adjustable damping valve such that the problem known from the prior art is eliminated.

The object is met with an adjustable damping valve in a damping valve housing for a vibration damper comprising a valve unit with an inlet opening in the region of a valve seat face. A valve disk is supported on the valve seat face and is pretensioned on its rear side by a spring. The pretensioning of the spring is adjustable for changing the damping force in that a supporting surface of the spring is displaceable.

According to the invention, this object is met in that the supporting surface is in a working connection with a catch device, wherein the catch device can be locked by stages or steps in that the spring which acts on the valve disk also applies force to locking bodies of the catch device in a catch profile. The dual function of the valve springs enables a very compact construction. With the exception of the locking bodies, there is practically no need for any additional structural component parts to be accommodated in the valve.

Further, the catch device advantageously has a rotatable drive sleeve which cooperates with a displacement sleeve, wherein the displacement sleeve has the supporting surface and, by means of a transmission device, executes the rotating movement of the drive sleeve as an axial movement. The drive sleeve can be constructed so as to be axially stationary through the use of the transmission device. The drive sleeve lies at least partially in the housing area of the valve housing. The axially stationary position of the drive sleeve facilitates sealing relative to the valve housing, since there is no axially changeable gap into which dirt or moisture can penetrate.

According to an advantageous embodiment, the transmission device is formed of a thread between the drive sleeve and the displacement sleeve, wherein the movability of the displacement sleeve is blocked by an axial guide in the circumferential direction.

Balls which catch in recesses of the catch profile are used as locking bodies. The catch profile are adapted to the equators of the balls The balls not only have good rolling characteristics, but are also comparatively economical structural component parts.

It is further provided that an additional second damping valve is arranged concentric to the above-described damping valve. The second damping valve comprises an internal carrier sleeve in which a spring-mounted second valve element is arranged. The pretensioning of the spring of this second damping valve is adjustable by a second adjusting device that is accessible from outside the valve housing in that the tensioning length or clamping length of the spring is adjustable. The second adjusting device has a rotating element which is rotatable relative to the carrier sleeve which, in turn, is considered stationary with respect to the second damping valve. The rotating movement of the rotating element can be locked by a second catch device. Therefore, the second valve is accordingly also secured against unwanted displacement. The second catch device is arranged between the carrier sleeve and the second adjusting device for this purpose.

So that both damping valves are independently securable, the rotating element of the second adjusting device engages a clamping sleeve by a positive engagement in the circumferential direction. The clamping sleeve, however, is axially movable relative to the rotating element. A thread connection between the clamping sleeve and the carrier sleeve converts a movement of the rotating element into an axial movement of the clamping sleeve.

The concentric arrangement of the valve parts enables a construction form of the second catch device in which the rotating element of the second valve has a transverse opening in which a catch spring acting on at least one locking body of the second catch device is arranged substantially horizontally. For purposes of an especially space-saving construction, the catch spring is tensioned in the transverse opening by a spring between two oppositely located locking bodies.

According to another advantageous feature, the locking bodies engage catch openings of the carrier sleeve, at least one of which is constructed as a through-opening and enters into a positive engagement with the drive sleeve of the first valve. All of the structural component parts are manufactured in a simple manner.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
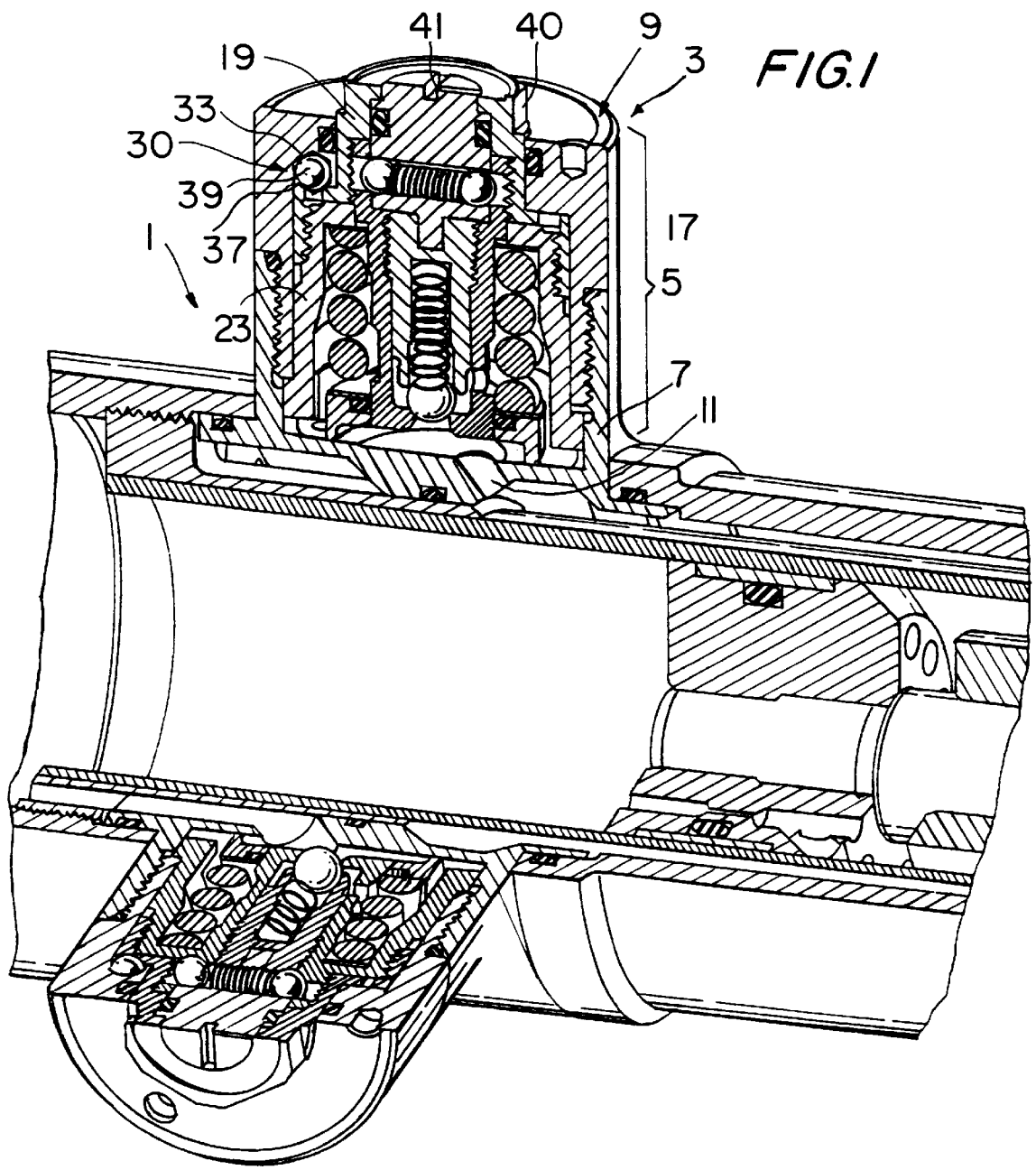
FIG. 1 is a partial sectional view showing a vibration damper with adjustable damping valve according to the invention.

Referring initially to FIG. 1, a vibration damper 1 is shown with a damping valve 3, according to the invention. The construction of the vibration damper 3 with respect to function and design is assumed as disclosed with respect to this invention from DE 195 42 293 A1, which reference is enclosed herein, in its entirety, by reference.

Figure 2:
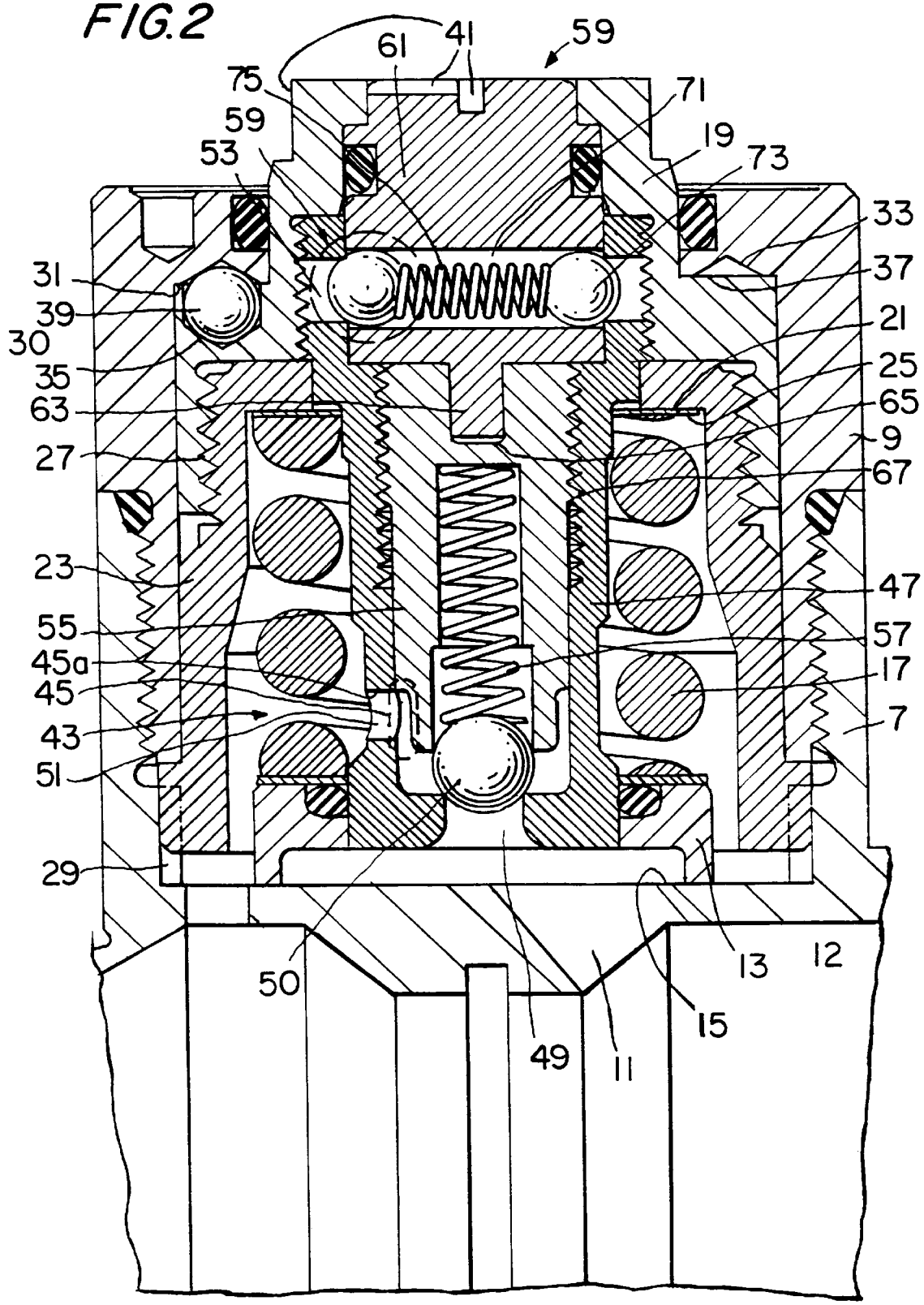
FIG. 2 is a sectional view of a damping valve of the vibration damper shown in FIG. 1.

Referring also to FIG. 2, the damping valve 3 is arranged inside a valve housing 5 which is formed in turn from a valve unit 7 and an end cap 9 which are threadably connected. A damping medium flows into the damping valve 3 through an inlet opening 11. The damping valve 3 comprises a first individual valve 12 which includes an axially movable valve disk 13 supported on a valve seat face 15 of the valve unit 7. A spring 17 pretensions the valve disk 13 in a closed direction. The spring 17 is pretensioned against the valve disk 13 by a supporting surface 21 on a displacement sleeve 23.

The pretensioning length of the spring 17, and therefore the force exerted by the spring 17, is adjustable by a drive sleeve 19 which is accessible from outside of the damping valve housing 5 and which extends through the end cap 9. The adjustment of the pretensioning length of the spring 17 is effected in that the supporting surface 21 of the spring 17 is displaced axially. A washer 25 may be inserted between the spring 17 and the supporting surface 21, if required.

A transmission device acts between the drive sleeve 19 and the displacement sleeve 23 in the form of a thread 27 between the drive sleeve 19 and the displacement sleeve 23 and an axial guide 29 between the valve unit 7 and the displacement sleeve 23. A rotating movement of the drive sleeve 19 is converted to an axial movement of the displacement sleeve 23 via thread 27, since the axial guide 29 between the valve unit 7 and the displacement sleeve 23 prevents the displacement sleeve 23 from participating in the rotating movement. The axial guide 29 may be constructed as a wedge profile, for example. In this case, the displacement sleeve 23 moves relative to the axially stationary drive sleeve 19. The drive sleeve 19 is also pretensioned by the spring 17. At one end, the spring 17 urges the valve disk onto the valve seat face 15. A the other end, spring 17 acts on the displacement sleeve 23, as was already described, and urges the drive sleeve 19 via the thread 27 against an end face 31 of the end cap 9. Therefore, drive sleeve 19 is accordingly held so as to be axially fixed. The changes in length of the spring 17 alter the operating pressure in the vibration damper 1.

As shown in FIG. 2, a catch device 30 secures the adjusted pretensioning of length of the spring 17. The catch device 30 includes a catch profile 33 in the end face 31 of the end cap 9, a catch profile 35 in a shoulder 37 of the drive sleeve 19 and spherical locking bodies 39. The catch profiles 35 are conical recesses formed in the end face 31 and shoulder 37 in the circumferential direction and can be made to coincide or overlap during rotation of the drive sleeve 19 with respect to the end cap 9. During the rotating movement of the drive sleeve 19, for which tool application surfaces 40 are provided (see FIG. 1), the locking of locking bodies 39 are released in that the drive sleeve 19 moves against the pretensioning force of the spring 17 toward the valve seat face 15. The displacement sleeve 23 executes this axial movement in a compulsory manner. In this way, the spring 17 carries out two functions. First, the spring 17 determines the lift-off behavior of the valve disk 13 and accordingly the damping force and, second, it makes up part of the catch device 30.

Different bearing locations are used for the locking bodies 39 as shown in FIGS. 1 and 2. In FIG. 1, the catch profile 33 is constructed with a depth such that the equator of the locking bodies 39 is covered by the end cap 9. The shoulder 37 constitutes the running path for the locking bodies 39. In the construction shown in FIG. 2, this constructional detail is executed in precisely the opposite manner. The end face 31 constitutes the running path and the locking bodies 39 are held in the drive sleeve 19. Either version is possible. The determination of which of the end cap 9 and the drive sleeve 19 should be the running path depends on which of the two components has the greater hardness. Although if both are made of relatively hard materials it does not matter which has the greater hardness.

In an advantageous construction, the damping valve 3 includes a second individual valve 43, designed for lower operating pressures and accordingly lower damping forces in the vibration damper 1. The second individual valve 43 includes a valve element having a carrier sleeve 47 with a control edge 45. The carrier sleeve 47 has a central inlet opening 49 and an outlet opening 51 for the damping medium. The cross-sectional intersection or overlap between the outlet opening 51 and the control edge 45 determines the advanced-opening or pre-opening cross section for the damping force range of lower operating pressures. In the setting shown in the drawing, the pre-opening cross section of the second valve 43 corresponds to the cross section of the outlet opening 51.

A check valve with a valve element 50 having a spherical body ensures a one-directional flow of the damping medium through the second valve 43. Assuming that a damping valve 3 is provided for each movement direction of the vibration damper and accordingly for every flow direction of the damping medium, the pre-opening cross section may also be adjusted in a direction-dependent manner due to the check valve 50. Within the valve housing 9, the carrier sleeve 47 is arranged concentric to the first valve 12 and is guided radially by a step of the drive sleeve 19. In the region of the step, the carrier sleeve 47 has openings 53 which the drive sleeve 19 engages in a positive engagement. During assembly, the two structural component parts are simply screwed together and, if necessary, secured by a thread locking paste. But disassembly is also possible, if required. The drive sleeve 19 and the carrier sleeve 47 are accordingly considered as one structural component part in practice.

A clamping sleeve 55 is installed within the carrier sleeve 47. The pretensioning of a spring 57 of the second valve 43, which acts on the valve element 50, can be adjusted by this clamping sleeve 55. An adjusting device 59 having a rotating element 61 adjusts the position of the clamping sleeve 55. Like the drive sleeve 19, the rotating element 61 is externally accessible and likewise has a tool application surface 41.

The rotating element 61 rotates relative to the carrier sleeve 47. The carrier sleeve 47 has a central step in which the rotating element 61 is supported. In this configuration, the rotating element is axially fixed, but is also rotatable in the circumferential direction. The rotating element 61 has a crosspiece 63 projecting from its inwardly directed end which resembles the blade of a screwdriver. This crosspiece 63 engages a slot 65 of the clamping sleeve 55, which is in a meshed connection with the carrier sleeve 47 via a thread 67. During a rotating movement of the rotating element 61, the clamping sleeve 55 is rotated by the crosspiece 63. During the rotation of the clamping sleeve 55 relative to the carrier sleeve 47, the meshed connection via the thread 67 effects an axial movement of the clamping sleeve 55.

The second individual valve 43 also has a catch device for locking the second individual valve at a specific setting. The openings 53 in the carrier sleeve 47 serve as catch openings. A transverse opening 71 in the rotating element 61 accommodates spherical locking bodies 73 corresponding to the construction of the first individual valve which produce a positive engagement between the carrier sleeve 55 and the rotating element 61. A catch spring 75 is also inserted in the transverse opening 71 between two locking bodies 73, thereby urging the locking bodies toward the catch openings 53.

The first and second individual valves 12 and 43 are independently adjustable. If the drive sleeve 19 is moved axially in the circumferential direction or between the catch steps, the carrier sleeve 47 likewise carries out this movement or these movements. However, the entire second individual valve 43 with its valve seat face 45a and the valve body 45 is installed inside the carrier sleeve 47, so that these movements have no influence on the function of the second individual valve 43. Conversely, the second individual valve 43 may be displaced relative to the first individual valve 12. Even assuming that the spring forces which hold the catch mechanism are of equal magnitude in both the first and second individual valves 12 and 43, the lever arm for the adjusting device of the second individual valve 43 is appreciably smaller than the lever arm for the catch device between the drive sleeve 19 and the end cap 9, so that the second individual valve 43 is adjustable independently from the first individual valve 12.

Figure 3:
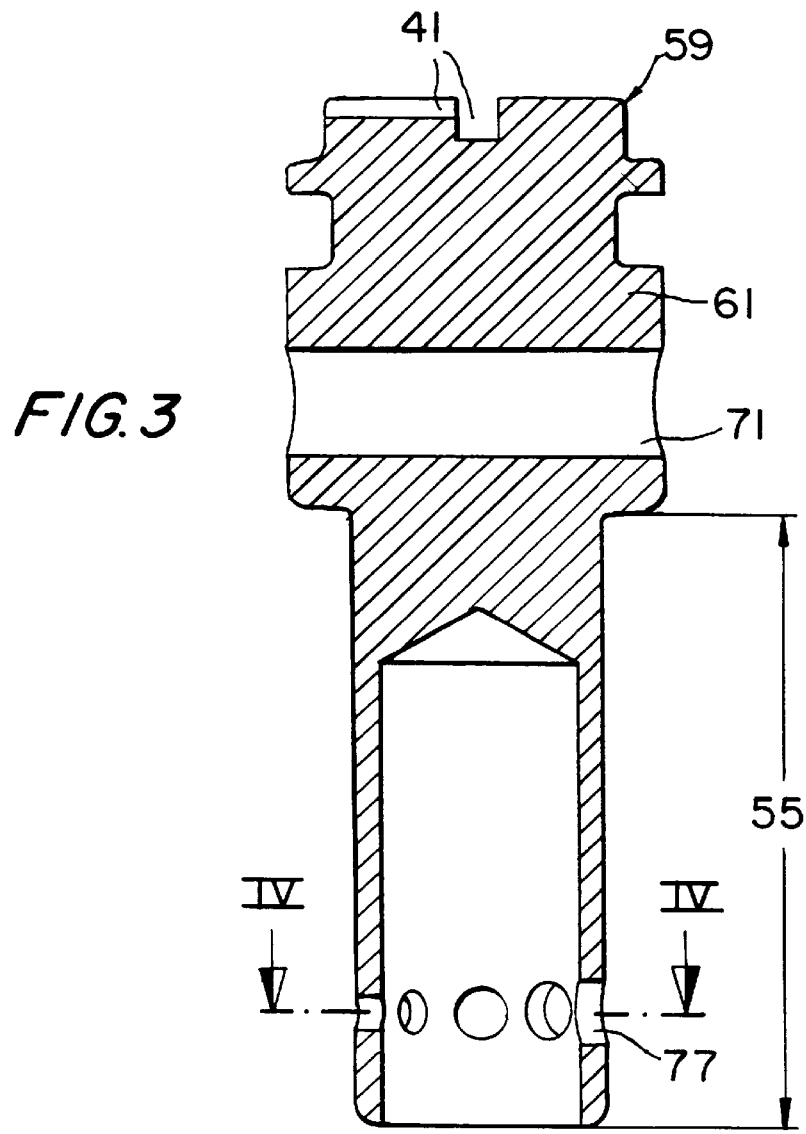
FIG. 3 is a sectional view of an embodiment of an adjusting device of the vibration damper of FIG. 1.
Figure 4:
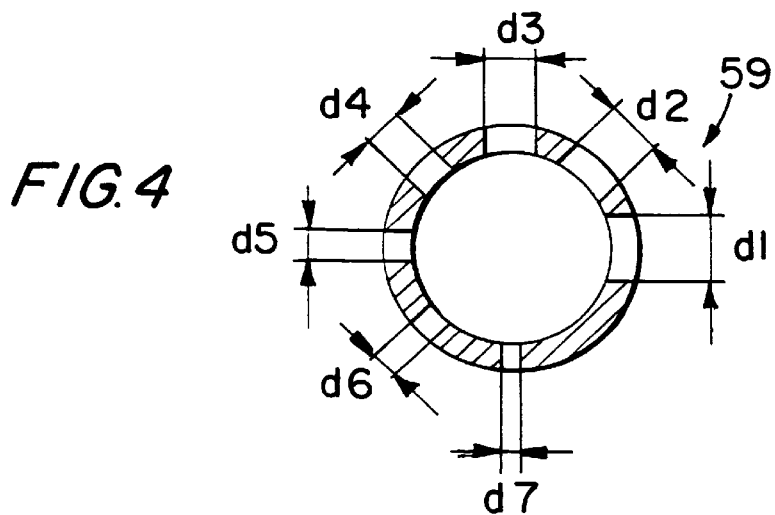
FIG. 4 is a sectional view along line IV—IV of the adjusting device in FIG. 3.

A modification of the functional unit comprising the drive sleeve 61 and clamping sleeve 55 in a one-part constructional unit is shown in FIG. 3. The essential difference with respect to function consists in that diaphragms or orifices 77 of different diameters $d_1$ are incorporated in the clamping sleeve portion 55. The orifices 77, when overlapping with the outlet opening 51 (FIG. 2), determine the pre-opening cross section and through-cross section of the second individual valve 43, so that a stepped adjustment is enabled. The clamping sleeve portion 55 moves no farther axially, since there is an axial locking between the drive sleeve 19 and a step of the carrier sleeve 47 (see FIG. 2). The thread 67 shown in FIG. 2 is omitted in this embodiment.

The construction according to FIG. 3 has a number of advantages. The first of these advantages is that the orifices 77 provide very precise through-cross sections. Dimensional tolerances play almost no part. Given sufficiently large dimensions of the outlet opening 51, a slight axial displacement of an orifice 77 has no effect on the size of the through-cross section.

Another advantage is that a large number of pre-opening cross sections may be realized by rotating the entire element, namely, eight in this construction, steps $d_1$ to $d_7$ and the closed pre-opening cross section between $d_7$ and $d_1$. On the other hand, in the construction according to FIG. 2, care must be taken not to select a thread pitch of the thread 67 that is too small, since otherwise, for example, more than one full rotation is required to effect a change from pre-opening step 6 to pre-opening step 1. A display of the steps on the rotating element 61 is not possible in this configuration since the position of the valve depends one the position of the rotating element and how many times the rotating element was fully rotated.

Apart from the described differences, the construction in FIG. 3 exactly corresponds to the structural component parts 59, 55 and 61. The valve part of FIG. 3 can be inserted like a cartridge into the installation space shown in FIG. 2.

The invention is not limited by the embodiments described above which are presented as examples only but can be modified in various ways within the scope of protection defined by the appended patent claims.

We claim:

1. An adjustable damping valve for a vibration damper, comprising:

a damping valve housing accommodating a first valve having a valve unit element with a valve seat face and an inlet opening in a region of said valve seat face, and a valve disk positioned on said valve seat face;

a first valve spring having a first end abutting said valve disk and a second end;

a supporting element having a supporting surface displaceably mounted in said damping valve housing, wherein said second end of said first valve spring rests on said supporting surface so that said first valve spring urges said valve disk against said valve seat face with a spring force which varies in response to a position of said displaceable supporting surface; and a catch device operatively mounted between said supporting element and said damping valve housing and comprising catch profiles in said supporting element and said damping valve housing, said catch device further comprising catch bodies, each one of which is held between one of said supporting element catch profiles and one of said damping valve housing catch profiles relative to the position of said supporting surface, wherein said first valve spring urges said supporting element against said catch bodies for resiliently holding said catch bodies in said catch profiles and thereby resiliently locking the position of said displaceable supporting surface.

2. The damping valve of claim 1, wherein said supporting element comprises a displacement sleeve and said catch device further comprises a rotatable drive sleeve;

a transmission device operatively connecting said drive sleeve and said displacement sleeve such that a rotating movement of said drive sleeve is converted to an axial movement of said displacement sleeve.

3. The damping valve of claim 2, wherein said transmission device comprises a threaded connection between said drive sleeve and said displacement sleeve and an axial guide is operatively mounted in said valve housing for blocking rotation of said displacement sleeve.

4. The damping valve of claim 1, wherein said catch bodies comprise balls which catch in recesses of said catch profiles and wherein said catch profiles are adapted to the equators of the balls.

5. The damping valve of claim 1, further comprising a second damping valve concentrically arranged relative to said first damping valve;

said second damping valve comprising an internal carrier sleeve having a second valve element mounted at an inlet opening;

a second spring urging said second valve element against said inlet opening;

an adjusting device rotatably mounted within said interior carrier sleeve and accessible from outside of the valve housing for changing a clamping length of the second spring, wherein said adjusting device comprises a rotating element rotatably mounted in said carrier sleeve, said carrier sleeve being stationary with respect to the second damping valve; and a second catch device for locking the rotating movement of said rotating element.

6. The damping valve of claim 5, wherein said second catch device is operatively mounted between said carrier sleeve and said adjusting device.

7. The damping valve of claim 5, further comprising a clamping sleeve connected to said rotating element and mounted within said carrier sleeve; said clamping element rotatably engaging said rotating element and axially movable with respect to said rotating element; and a threaded connection between said clamping sleeve and said carrier sleeve converting a rotational movement of said rotating element into an axial movement of the clamping sleeve.

8. The damping valve of claim 5, wherein said rotating element comprises a transverse opening; and a catch spring inserted in said transverse opening acts on at least one locking body of said second catch device, wherein said at least one locking body engages one of a plurality of catch profiles in said carrier sleeve.

9. The damping valve of claim 8, wherein said catch spring is tensioned in the transverse opening between two locking bodies located on opposing sides of said transverse opening.

10. The damping valve of claim 5, wherein said second catch device comprises locking bodies that engage second catch openings in the carrier sleeve, wherein at least one of said second catch openings is constructed as a through-opening and enters into a positive engagement with said supporting element.

* * * * *